(12) United States Patent
Raman et al.

(10) Patent No.: US 10,466,890 B2
(45) Date of Patent: Nov. 5, 2019

(54) QUICK GESTURE INPUT

(71) Applicant: Google LLC, Mountain View, CA (US)

(72) Inventors: Tiruvilwamalai Venkatram Raman, San Jose, CA (US); Charles L. Chen, San Jose, CA (US)

(73) Assignee: Google LLC, Mountain View, CA (US)

( * ) Notice: Subject to any disclaimer, the term of this patent is extended or adjusted under 35 U.S.C. 154(b) by 235 days.

(21) Appl. No.: 15/466,241

(22) Filed: Mar. 22, 2017

(65) Prior Publication Data

US 2017/0192670 A1    Jul. 6, 2017

Related U.S. Application Data (63) Continuation of application No. 14/280,778, filed on May 19, 2014, now Pat. No. 9,639,267, which is a continuation of application No. 12/234,222, filed on Sep. 19, 2008, now Pat. No. 8,769,427.

(51) Int. Cl.
| | |
|---|---|
| *G06F 3/0488* | (2013.01) |
| *G06F 3/023* | (2006.01) |
| *G06F 3/01* | (2006.01) |
| *G06F 3/16* | (2006.01) |
| *G06F 3/0482* | (2013.01) |

(52) U.S. Cl.
CPC .......... *G06F 3/04883* (2013.01); *G06F 3/016* (2013.01); *G06F 3/0233* (2013.01); *G06F 3/0236* (2013.01); *G06F 3/0482* (2013.01); *G06F 3/04886* (2013.01); *G06F 3/167* (2013.01); *G06F 2203/04804* (2013.01); *G06F 2203/04808* (2013.01)

(58) Field of Classification Search
CPC .... G06F 3/016; G06F 3/0233; G06F 3/04883; G06F 3/167
See application file for complete search history.

(56) References Cited

U.S. PATENT DOCUMENTS

| | | |
|---|---|---|
| 4,531,231 A | 7/1985 | Crane et al. |
| 4,561,105 A | 12/1985 | Crane et al. |
| 4,718,102 A | 1/1988 | Crane et al. |
| 4,763,365 A | 8/1988 | Gerondale et al. |

(Continued)

FOREIGN PATENT DOCUMENTS

WO    2008/075822    6/2008

OTHER PUBLICATIONS

Extended European Search Report in European Application No. 09815208.5, dated Jul. 17, 2014, 6 pages.

(Continued)

*Primary Examiner* — Eric J. Bycer
(74) *Attorney, Agent, or Firm* — Fish & Richardson P.C.

(57) ABSTRACT

A computer-implemented user interface method for a computing device is disclosed. The method includes associating each of a plurality of telephone keys with a direction of each key relative to a center of a telephone keypad, receiving a contact from a user of the device at a location on a touchscreen display of a computing device and an input at a direction relative to the location of the user contact, and causing a telephone number to be entered on the computing device based on the direction of each key relative to the center of the telephone keypad corresponding to the direction relative to the location of the user contact.

19 Claims, 6 Drawing Sheets

(56) References Cited

U.S. PATENT DOCUMENTS

| | | | |
|---|---|---|---|
| 5,022,086 | A | 6/1991 | Crane et al. |
| 5,049,862 | A | 9/1991 | Dao et al. |
| 5,561,705 | A | 10/1996 | Allard et al. |
| 5,596,656 | A | 1/1997 | Goldberg |
| 5,657,378 | A | 8/1997 | Haddock et al. |
| 5,732,152 | A | 3/1998 | Sakai et al. |
| 5,764,794 | A | 6/1998 | Perlin |
| 5,790,115 | A | 8/1998 | Pleyer et al. |
| 5,805,167 | A | 9/1998 | van Cruyningen |
| 5,864,635 | A | 1/1999 | Zetts et al. |
| 5,923,793 | A | 7/1999 | Ikebata |
| 5,933,514 | A | 8/1999 | Ostrem et al. |
| 6,044,174 | A | 3/2000 | Sinden |
| 6,057,845 | A | 5/2000 | Dupouy |
| 6,104,317 | A | 8/2000 | Panagrossi |
| 6,208,757 | B1 | 3/2001 | Sinden |
| 6,212,295 | B1 | 4/2001 | Ostrem et al. |
| 6,243,080 | B1 | 6/2001 | Molne |
| 6,340,800 | B1 | 1/2002 | Zhai et al. |
| 6,366,697 | B1 | 4/2002 | Goldberg et al. |
| 6,493,464 | B1 | 12/2002 | Hawkins et al. |
| 6,597,345 | B2 | 7/2003 | Hirshberg |
| 6,646,633 | B1 | 11/2003 | Nicolas |
| 6,654,496 | B1 | 11/2003 | Goldberg |
| 6,670,951 | B2 | 12/2003 | Clough et al. |
| 6,704,006 | B2 | 3/2004 | Cherry et al. |
| 6,765,556 | B2 | 7/2004 | Kandogan et al. |
| 6,775,560 | B2 | 8/2004 | King et al. |
| 6,816,859 | B2 | 11/2004 | Goldberg et al. |
| 6,839,464 | B2 | 1/2005 | Hawkins et al. |
| 6,847,706 | B2 * | 1/2005 | Bozorgui-Nesbat ......... G06F 3/0233 345/172 |
| 6,944,472 | B1 | 9/2005 | Ishigami |
| 7,013,258 | B1 | 3/2006 | Su et al. |
| 7,042,809 | B2 | 5/2006 | Mignot |
| 7,124,433 | B2 | 10/2006 | Little |
| 7,145,554 | B2 | 12/2006 | Bachmann |
| 7,250,938 | B2 | 7/2007 | Kirkland et al. |
| 7,251,367 | B2 | 7/2007 | Zhai |
| 7,404,148 | B2 | 7/2008 | Lincke et al. |
| 7,406,666 | B2 | 7/2008 | Davis et al. |
| 7,487,461 | B2 | 2/2009 | Zhai et al. |
| 8,098,239 | B1 | 1/2012 | Moore |
| 8,106,890 | B2 | 1/2012 | Do et al. |
| 2002/0036618 | A1 | 3/2002 | Wakai et al. |
| 2002/0122072 | A1 | 9/2002 | Selker |
| 2003/0048948 | A1 | 3/2003 | Confer et al. |
| 2003/0064736 | A1 | 4/2003 | Bickerton et al. |
| 2004/0008191 | A1 | 1/2004 | Poupyrev et al. |
| 2004/0021691 | A1 | 2/2004 | Dostie et al. |
| 2004/0021696 | A1 | 2/2004 | Molgaard |
| 2004/0070567 | A1 | 4/2004 | Longe et al. |
| 2004/0095393 | A1 | 5/2004 | Anson |
| 2004/0104896 | A1 | 6/2004 | Suraqui |
| 2004/0120583 | A1 | 6/2004 | Zhai |
| 2004/0135774 | A1 | 7/2004 | La Monica |
| 2004/0263487 | A1 | 12/2004 | Mayoraz et al. |
| 2005/0114115 | A1 | 5/2005 | Karidis et al. |
| 2005/0146508 | A1 | 7/2005 | Kirkland et al. |
| 2005/0190973 | A1 | 9/2005 | Kristensson et al. |
| 2005/0210402 | A1 | 9/2005 | Gunn et al. |
| 2005/0210418 | A1 | 9/2005 | Marvit et al. |
| 2005/0223308 | A1 | 10/2005 | Gunn et al. |
| 2005/0237299 | A1 | 10/2005 | Ha |
| 2005/0240879 | A1 | 10/2005 | Law et al. |
| 2005/0275633 | A1 | 12/2005 | Varanda |
| 2006/0033723 | A1 | 2/2006 | Maw |
| 2006/0055662 | A1 | 3/2006 | Rimas-Ribikauskas et al. |
| 2006/0055669 | A1 | 3/2006 | Das |
| 2006/0082540 | A1 | 4/2006 | Prior |
| 2006/0197753 | A1 | 9/2006 | Hoteliing |
| 2006/0253793 | A1 | 11/2006 | Zhai et al. |
| 2006/0267931 | A1 | 11/2006 | Vainio et al. |
| 2007/0013670 | A1 | 1/2007 | Chien et al. |
| 2007/0094024 | A1 | 4/2007 | Kristensson et al. |
| 2007/0139382 | A1 | 6/2007 | Kotipalii |
| 2007/0256029 | A1 | 11/2007 | Maxwell |
| 2007/0298785 | A1 | 12/2007 | Lee |
| 2007/0300175 | A1 | 12/2007 | Lu |
| 2008/0036743 | A1 | 2/2008 | Westerman et al. |
| 2008/0096610 | A1 | 4/2008 | Shin et al. |
| 2008/0150905 | A1 | 6/2008 | Grivna et al. |
| 2008/0158024 | A1 | 7/2008 | Steiner et al. |
| 2008/0163119 | A1 | 7/2008 | Kim et al. |
| 2009/0189864 | A1 | 7/2009 | Walker et al. |
| 2009/0249258 | A1 | 10/2009 | Tang |
| 2009/0273571 | A1 | 11/2009 | Bowens |
| 2010/0058251 | A1 | 3/2010 | Rottler et al. |
| 2010/0064261 | A1 | 3/2010 | Andrews et al. |
| 2011/0141027 | A1 | 6/2011 | Ghassabian |

OTHER PUBLICATIONS http://mrl.nyu.edu/~perlin/demos/quikwriting.html.

http://www.almaden.ibm.com/u/zhai/shapewriter_research.htm.

Helft, M. For the Blind, Technology Does What a Guide Dog Can't [online], Jan. 3, 2009 [retrieved on Jan. 5, 2009]. Retrieved from the Internet: <URL: http://www.nytimes.com/2009/01/04/business/04blind.html?ref=technology >, 4 pages.

Kristensson, P-O.and Zhai, S. "Relaxing Stylus Typing Precision," by Geometric Pattern Matching. Proc. IUI 2005-ACM Conference on Intelligent User Interfaces 2005, pp. 151-158, ACM Press.

Lee, P., Zhai, S. "Top-down learning strategies: can they facilitate stylus keyboard learning?" International Journal of Human-Computer Studies, vol. 60 (5&6) pp. 585-598, 2004.

Shapewriter, Inc. <URL: http://www.shapewriter.com>.

Smith, B.A., Zhai, S. Optimised Virtual Keyboards with and without Alphabetical Ordering—A Novice User Study, in Proc. of INTERACT 2001: Eighth IFIP Conference on Human-Computer Interaction, Tokyo, Japan, Jul. 9-13, pp. 92-99.

Ricadela, Aaron. Trying to Make the Pen as Mighty as the Keyboard. The New York Times, Nov. 11, 2004. Retrieved from the Internet. <URL: http://www.nytimes.com/2004/11/11/technology/circuits/11next.html?_r=2&ex=1100322000&en=3cf8982014938668&ei=5030&partner=PRESSDEMO>, 4 pages.

Zhai, Shumin. Shape Writing Technology. IBM Almaden Research Center. <URL: http://www.almaden.ibm.com/u/zhai/shapewriter_research.htm>, 3 pages.

Zhai, S., Kristensson P.O. Shorthand Writing on Stylus Keyboard. IBM Almaden Research Center. <URL: http://www.almaden.ibm.com/cs/people/zhai/papers/SharkFinal.pdf>, 8 pages.

Zhai, S., Smith B.A. ATOMIK and Other Stylus Keyboards. IBM Almaden Research Center. <URL: http://www.almaden.ibm.com/u/zhai/ATOMIK.htm>, 2 pages.

Zhai, S., Hunter, M., Smith, B.A., The Metropolis Keyboard—An Exploration of Quantitative Techniques for Virtual Keyboard Design, in the Proceeding of the 13th Annual ACM Symposium on User Interface Software and Technology (UIST 2000), Nov. 5-8, 2000, San Diego, California. pp. 119-128.

Zhai, S., Hunter, M., Smith, B.A., Performance Optimization of Virtual Keyboards, Human-Computer Interaction, vol. 17 (2&3). pp. 229-269, 2002.

International Search Report & Written Opinion for Application No. PCT/US2009/057339, dated May 10, 2010, 11 pages.

Thina Nickitas-Etienne, International Preliminary Report on Patentability for Application No. PCT/US2009/057339, dated Mar. 22, 2011, 6 pages.

MacKenzie et al., "Text Entry for Mobile Computing: Models and Methods, Theory and Practice," Human Computer Interaction, 2002, vol. 17, pp. 147-198.

Kristensson, Per-Ola, "Design and Evaluation of a Shorthand Aided Soft Keyboard," Master's Thesis, Linkoping University, Sweden, 2002, 107 pages.

Kristensson et al., "Shark2: A Large Vocabulary Shorthand Writing System for Pen-based Computers," 2004, vol. 6, issue 2, pp. 43-52.

(56) References Cited

OTHER PUBLICATIONS

Kristensson, Per-Ola, "Discrete and Continuous Shape Writing for Text Entry and Control," Dissertation, Linkoping University, Sweden, 2007, 215 pages.

\* cited by examiner

QUICK GESTURE INPUT

CROSS-REFERENCE TO RELATED APPLICATIONS

This application is a continuation application of and claims priority to U.S. application Ser. No. 14/280,778, filed on May 19, 2014, which is a continuation of U.S. application Ser. No. 12/234,222 (now U.S. Pat. No. 8,769,427), filed on Sep. 19, 2008, and issued as U.S. Pat. No. 8,769,427, the entire contents of which are hereby incorporated by reference.

TECHNICAL FIELD

This document relates to user interfaces for computing devices such as mobile devices in the form of smart phones.

BACKGROUND

Mobile computing continues to grow quickly as mobile devices, such as smart phones, add more power and more features. Users of such devices may now access various services on the internet, such as mapping applications, electronic mail, text messaging, various telephone services, general web browsing, music and video viewing, and similar such services. The small size of mobile devices may make it difficult to interact with such services, because a full QWERTY keyboard may not be available on a mobile device or may not be available at all times. Thus, input to a mobile device may occur via a standard telephone dialing pad (e.g., via multi-tap inputs) or a touch screen.

In addition, interaction with a mobile device may occur in a variety of situations, in varying levels of concentration for a user. At one end of a spectrum, a user may be able to provide full attention to their device, such as when they are at their desk or riding on mass transit. At the other end of the spectrum, a user may be busy having a conversation or driving their automobile, so that any interaction with their mobile device should require a minimum amount of attention from the user.

SUMMARY

This document describes systems and techniques that a user may employ in order to enter information into a mobile computing device. In general, an application or operating system on a mobile device may establish certain gestures on a touch screen that will result in particular inputs being used by the application or another application on the device. The initial point of contact by a user on a display (e.g., with the user's fingertip) may establish an anchor point that is then used to identify a subsequent direction of input by a user (e.g., via a dragging motion or a second press on the screen). The direction may be mapped to a keypad, with the anchor point representing a key or area on the keypad (e.g., a center key of the keypad) and the dragging direction representing a desired key in the relevant direction from the center key. Where a keypad is larger, so that multiple keys may be located in the same direction from an anchor key, additional user input may indicate the appropriate key, from the multiple keys in the particular direction, that is intended by the user. In addition, feedback may be provided to a user to indicate the keypress that has been registered in response to their input, such as by having a device speak the input associated with the keypress. Such feedback may come in a number of forms, such as spoken (e.g., synthesized or digitized speech), auditory (e.g., tones or clicks), and tactile (e.g., rumble or tap) feedback, where such feedback is synchronized to registration of the inputs. Thus, in addition to hearing the value of a pressed key spoken, a user may also hear a short sound, synchronized with tactile feedback such as vibration. Such feedback may improve the sensation of "moving over" or "pressing" a button.

In one example, a telephone dialing system may be provided. A user's initial point of contact with a touchscreen may be taken by the system as the location of the "5" key on a telephone keypad. Subsequent dragging by the user in a radial direction may select a key on the keypad that is in the radial direction from the "5" key, whether or not the user's contact on the screen is actually over a "5" key that might be displayed on a virtual keyboard on the screen. For example, dragging downward relative to the initial point of contact may indicate entry of an "8," while dragging in a upper-right or Northeast direction may represent entry of a "3." Particular strokes may indicate entries of keys that are not directly radially related to the "5" key, such as a tap indicating entry of the "5" key, a circle indicating entry of the "0" key, and other special strokes indicating entry of the pound or asterisk keys. Other inputs, such as shaking and/or tilting the device, can provide other commands.

In certain embodiments, the features discussed here may provide one or more advantages. For example, a user can enter data into a device without having to look at the device, where the data input is determined by a direction of input, and where the initial point of input from the user is independent of the keypress to be entered. In particular, the user may operate a mobile device without having to take their visual attention away from another activity. Moreover, such a system may be learned in certain implementations without a user having to learn an input lexicon. Also, blind users may more easily interact with a computing device having a touchscreen interface. Such features may have benefits in terms of better usability and safety.

In one implementation, a computer-implemented user interface method for a computing device is discussed. The method comprises associating each of a plurality of telephone keypresses with a direction of each key relative to a center of a telephone keypad, receiving a user contact from a user of the device at a location on a touchscreen display of a computing device and an input at a direction relative to the location of the user contact, and causing a telephone number to be entered on the computing device based on the direction of each key relative to the center of the telephone keypad corresponding to the direction relative to the location of the user contact. The input at a direction relative to the location of the user contact can comprise a dragging input starting at the location of the user contact.

In some aspects, the entered telephone number corresponds to a radial direction relative to a five on a standard telephone keypad. The method can also include receiving a tap input in addition to the input at a direction relative to the location of the user contact and causing an execution of a command associated with the tap input. The method also can comprise using the tap input to identify the input as a non-numeric input. In addition, an audible feedback can be provided announcing the entered telephone number. The method also can include providing a tactile feedback to register, to a the user, reception of the input.

In another implementation, a computer-implemented user interface method is disclosed. The method comprises associating each of a plurality of keystrokes with a radial direction, receiving a user contact at a location on a touchscreen display and an input at a direction relative to the location of the user contact, correlating the direction relative to the location of the user contact to a radial direction for one of the plurality of keystrokes, and registering a keystroke for a key of a virtual keyboard in the direction relative to the location of the user contact. The input at a direction relative to the location of the user contact can comprise a dragging input starting at the location of the user contact. The method can also include providing audible feedback concerning a selected keystroke during the dragging input, and receiving a corrective dragging input at an angle different than the direction relative to the location of the user contact, wherein the registered keystroke corresponds to the angle of the corrective dragging input.

In one aspect, the method also comprises assigning the location on the touchscreen display to a predetermined location on a virtual keyboard, and registering a keystroke for a key in a direction from the predetermined location according to the direction relative to the location of the user contact. The method can also include repeating the steps of receiving, correlating, and registering for each of a plurality of alphanumeric characters and combining the characters into a data entry string. In addition, the method can include receiving a tap input in addition to the input at a direction relative to the location of the user contact.

In yet another aspect, the method additionally includes using the tap input to identify the input as relating to one of a plurality of groups of characters. The method can also comprise providing an audible feedback announcing the content of the entered keystroke, and can further comprise receiving, from an computer application, enrollment information associating each of a plurality of directions with keystrokes, and providing the keystroke for the key of the virtual keyboard to the application.

In yet another implementation, a computer-implemented data entry system is disclosed. The system comprises a touchscreen input manager to receive and interpret user inputs on a touchscreen of a computing device, one or more computing applications, and a gesture interface to receive registrations from the one or more computing applications, wherein the registrations include an input direction and a corresponding keypress, and to provide data for keypresses to the applications in response to receiving directional inputs on the touchscreen. The gesture interface can provide data for keypresses independent of an actual starting location of an input on the touchscreen. The gesture interface can also superimpose itself over an existing graphical interface on the touchscreen when the gesture interface is invoked. In addition, the gesture interface can be programmed to generate data for producing an audible signal indicating values of keypresses on the device.

In another implementation, a computer-implemented data entry system is disclosed that comprises a touchscreen input manager to receive and interpret user inputs on a touchscreen of a computing device, one or more computing applications, and means for providing directional user-entered data from the touchscreen to the one or more computing applications.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes systems and techniques for receiving user input on a touchscreen of a computing device in a manner that is relatively quick and involves reduced user visual attention to the input process. The user input may begin with a user contact (e.g., a finger touch) on a touchscreen and may proceed with an additional user input in a direction from the initial user contact, such as by the user dragging their finger in a direction measured radially from the initial point of contact. The particular direction of the dragging may represent an intended input that corresponds to a key on a virtual keyboard or keypad that is located in the respective direction from an anchor key on the keyboard. Thus, for example, the point of initial contact may be assumed to be a center key of a keypad, whereas a direction of the subsequent user input may represent a key, in that direction relative to the center key, that the user would like to press. In certain scenarios, the keypad need not be shown on the display in order for the inputs to be mapped to the keypad, or the inputs need not be aligned with the keypad if it is displayed.

Figure 1:
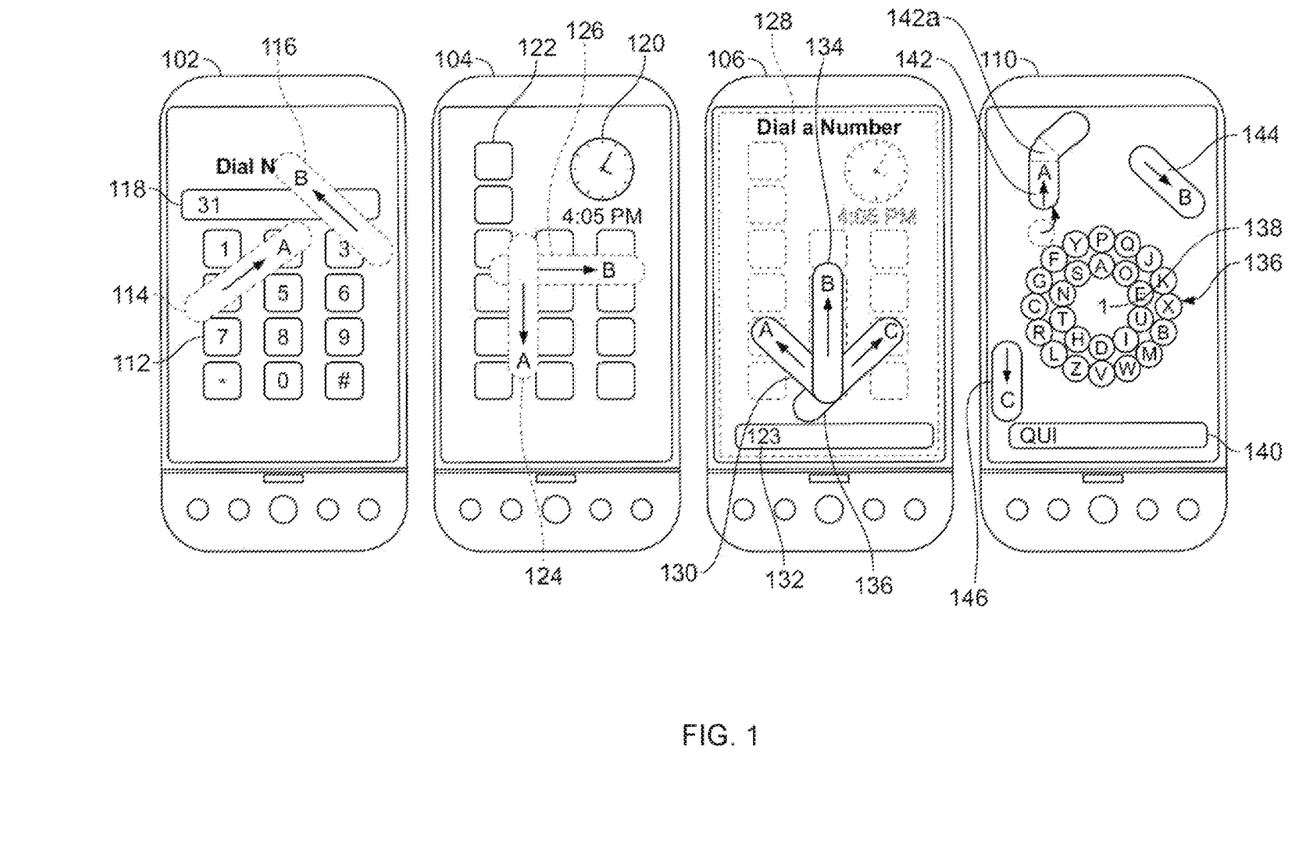
FIG. 1 shows example screenshots of a mobile device providing for touchscreen user input.

FIG. 1 shows example screenshots of a mobile device providing for touchscreen user input. In general, four different displays 102-110 are shown to provide examples demonstrating how the techniques described here can be implemented. Each of the displays 102-110 are shown in a mobile device having a touchscreen graphical user interface, where the device may be loaded with a number of computer applications, including a telephone dialing application. Telephone dialing may be a particularly appropriate application for the techniques described here because talking on a telephone traditionally does not require eye contact with the device, while dialing of a telephone typically requires visual or tactile contact. As a result, people may feel comfortable making a telephone call when they do not have such eye contact, but may unnecessarily take their attention away from their other work while they are dialing.

Display 102 shows such an example of user telephone dialing input. The display 102 looks like a standard smart phone virtual dialing pad, having a standard telephone keypad 112 displayed on a touchscreen, and a data entry area 118 showing numbers entered by a user. In a typical configuration, the user may simply tap each number on the keypad to enter the numbers. However, such entry requires the user to know where each of the numbers is located, and such awareness may require the user to look at the keypad—something that is difficult to do if the device is in a pocket or holster, or at the user's ear.

As a result, an alternative (or in this case, additional) data entry technique is provided. In particular, because normal dialing on the interface 102 involves tapping, the system can recognize dragging motions as involving an alternative user intent. In particular, dragging motions on the display 102 may be interpreted to be directed at entering dialing keypad information based on a direction of the dragging.

Two such dragging examples, shown on display 102, may illustrate this point. The first dragging example 114, labeled "A," represents a path of a user's finger dragging across the display 102—here, in an upper-right or Northeast direction. The dragging motion starts with an initial user contact over the "4" key on the display 102, but the ultimate input is determined independent of that particular correspondence between the contact point and the currently-displayed selection under the contact point. Rather, the character that is deemed to be input by the user is the character—on the virtual keypad shown on the display 102—that is in the dragged direction relative to the center of the keypad. In this example, the center of the keypad is the "5" key, and the key to the upper-right of that key is the "3" key. Therefore, the data entry area 118 shows a "3" in its first position, so that a telephone number ultimately dialed by the device will start with the digit 3.

The second dragging example 116, labeled "B," represents a follow-up input by the user. This time, the user starts in the upper-right corner of the display 102 and drags to the upper-left, or Northwest. Again, the interpreted input is deemed to have started at the center of the keypad, and to have selected the key on the dragged direction on the keypad, which here is the "1" key (i.e., the "1" key is Northwest of the "5" key). As a result, the second displayed digit in the data entry area is a "1." The actual starting point of dragging example 116 did not matter—rather, what mattered was the direction of the dragging.

In certain examples, the general location of the start of a dragging operation may have some effect on the input, as that input is interpreted by a device. For example, a screen may be split into two portions so that selections in directions on one half of the screen are interpreted in a different manner than selections in the same directions on the other half of the screen. Still, however, the selections may be independent of the actual initial location of the contact, in that any selection in the appropriate direction in the designated area, will have the same result, regardless of where in that designated area the selection began.

In certain situations, like that shown in display 102, not all of the relevant keys will be arrayed in a single radial direction from an anchoring point, such as the "5" key. In those situations, additional gestures may be used to signal an intent to enter such additional keys. For example, a single tap may represent an intent to select the middle key. Other times, multiple taps or dragging other than in a radial direction may indicate such an intent. For example, drawing a circle—though it may be slower than a straight radial drag—may be used to indicate an intent to press the "0" key. Other tapping or curved gestures may represent an intent similar to pressing a "control" or "caps lock" key on a standard keyboard.

Display 104 provides an example similar to that in display 102, but over a desktop for a mobile operating system. In particular, the display 104 shows a number of selectable application icons such as icon 122, and a widget 120 in the form of a clock, displayed together on a single level of a desktop. This may be the display that is generally shown to a user of a device when no particular application is the focus of the device's operating system (e.g., when no applications are launched or when all the applications' windows are minimized). In this example, two user dragging selections are again shown. The first dragging selection 124, labeled "A," is made in a downward direction, and the second dragging selection 126 is made in a rightward direction. Thus, if the relevant input mode of the device at the time of the entries were for a dialing application or another application relating to a telephone keypad (e.g., texting), the user selections may represent an intent to select the "8" key (which is below the center, "5" key) and the "6" key (which is to the right of the center, "5" key).

The user data entries may be interpreted in other contexts, however, and the particular context may be set in a number of different ways. As one example, user entries on the desktop may be assumed, initially, to relate to the elements on the desktop, so that, for example, tapping an icon causes an application associated with the icon to be launched, and dragging on an icon causes the icon to be relocated. However, if a user makes an input action to display 104, where the action does not correspond to an action supported by the display 104 at the current time, the action may be taken by the device as directed at an alternative application. For example, if a user presses down on an icon and drags it to a location at which it cannot be dropped, such a seemingly incongruous action may be interpreted as being directed to an alternative input mechanism on the device, which will involve interpreting the input according to the direction of the dragging.

Also, a particular user gesture may be used to activate such an alternative input mechanism. For example, if a user traces a circle over a desktop, such an action may activate the alternative input mechanism. Also, accelerometer input may be taken as an indication to provide for an alternative input mechanism, such as by a user shaking the device in a particular manner. Also, if the device senses other environmental variables, such as by sensing that its front side or screen is close to an object (e.g. it is in a user's pocket or close to the user's head), the alternative input mechanism may be automatically enabled.

A user may be able to specify which application, of several applications, will be enabled when an alternative input mechanism is acting over a desktop. For example, in an operating system configuration screen or in a configuration screen for the alternative input mechanism, the user can identify an application to which input data is to be passed (such as a telephone dialer) when no other application is an obvious recipient of the input (such as when no other application is active). Also, a user may speak the name of an application to enable alternative touch input for that application.

One such user example may better highlight the concepts discussed here. For example, a user may speak the word "dialer" to have their device change to a mode in which dialing may take place. While the user could also speak the numbers to dial, they may be in a noisy area (or a quiet area) in which they would like to minimize their level of voice input. The voice input may launch a dialer application and may also cause that application to be displayed in place of a desktop that was previously shown on the display, as with display 102. Alternatively, the dialer may be invoked or may not be displayed, as with display 104. The user may then make dragging motions on the display in particular directions to enter keys to be dialed, and may shake their phone or press a dial key (e.g., such as one of the buttons below display 102 or display 104) to cause the numbers they have entered to be dialed.

Alternatively, a user wanting to send a text message may speak the words "text," and may then enter characters for a text message. Such entry may occur in a number of ways.

For example, the user may make entries that correspond to text entry via a standard telephone keypad. In one example, dragging in various compass directions or orientations may result in the entry of numbers, while dragging in a direction and then tapping one to four times may result in a particular letter associated with the key in that direction being entered.

A device may also provide audible feedback in the form of the content of an interpreted data entry intent. As one example for entering text, when a user drags to the right, their device may speak "six." If they then lift their finger and tap once, the device may speak "m," to cycle through the various values for the "6" key. If the user then drags their finger down and right, the device may speak "nine," and if they tap again, the device may speak "w." Another tap may cause "x" to be spoken, and another may cause "y" to be spoken. In this manner, a form of multi-tap input may be provided without the user having to look at the touchscreen. The spoken value may also be combined with an audible tone or other similar sound so as to more quickly indicate when an input value has been registered by a system.

Additional feedback may be provided tactilely. For example, a device may vibrate slightly when a character entered by a user is registered by a device, so that the user will know that they can move on to entering their next character. Such feedback may be in place of audible feedback or may be in addition to audible feedback, so as to reinforce the message provided by the audible feedback. In this manner, the user may be provided an improved sensation of pressing or rolling over a certain selection (even though their actually finger may not be rolling over any visible element on the touchscreen).

Deletion of characters that have been entered and other such functions may be performed in various manners, including by the functions being assigned to one of the virtual keyboard keys and being selected in the manners discussed above. Alternatively, special input mechanisms may be used. For example, deleting a character may be accomplished by shaking a mobile device (where the device includes an accelerometer) or by jerking the device to the left (to signify shifting of the cursor to the left). Such deletion may also be accompanied by audible and/or tactile feedback, such as by speaking all of the characters that remain after the deletion, or by speaking something like, "Letter CS' deleted." Also, a special button on the device may be used for such functions, such as an off-screen soft button.

Referring now to the third display in the figure, display 106, a scenario like that shown in display 104 is provided. In this example, the presence of an alternative data entry interface is made known visually to a user. The interface relates to dialing on a telephone number but does not entirely replace a desktop with a dialer. Rather, an interface overlay 128 is shown in a translucent manner with an instruction of "dial a number" to indicate to a user who may be looking at the display 106 that the device is currently in an alternative data entry mode.

A data input box 132 may also be provided as part of the overlay 128 so as to provide an indication of the data that the user has entered. The data input box 132 may be translucent like the rest of the box or opaque so as to better display the data that a user has input to the device. In addition, other data display objects may be provided with the overlay 128 to provide visual input to a user, though the visual input may be optional when considering that the user may not be looking at the device while entering data into it.

In certain implementations, the data may be associated with a particular application only after it has been entered by a user. For example, if a user enters ten numeric digits and then provides an indication that they are finished entering data (e.g., by tapping or shaking their device), an interface module may infer that the person entered a telephone number and may provide the number to a dialer on the device. In a like manner, if the user enters a number of words, the interface module may provide the text to a text messaging application, to a note taking application or to another similar application, where the selection of an application can depend on the context (e.g., on the content or size of the text entered). Alternatively, a device may identify several possible uses for the text and may ask a user for an additional entry indicating how they would like the data used.

In the example in the figure, three different entries are shown. A first dragging selection 130 is made in an upper-left direction, thus indicating selection of a "1" key on a dialing keypad. If the user had subsequently tapped on the display 106, an alternative entry may have been provided, or the system may have interpreted the tapping as entry of a "5" key, since the "1" key has no letters assigned to it on a standard keypad. A second dragging selection 134 is labeled "B," and represents a selection of the "2" key, while a third dragging selection 136, labeled "C," represents a selection of the "3" key. Thus, the data entry area shows the numbers "123." The user may continue entering numbers until the data they intended to enter is complete.

Display 110 shows an example of alphanumeric data entry. A virtual keypad 136 is shown in the middle of display 110 and represents a circular representation of the alphabetic keys on a standard Dvorak keyboard. Such a keyboard is designed to permit fast typing, so that frequently-used letters are placed along the middle row of the keyboard, and infrequently-used letters are placed in the upper and lower rows, and also at the edges. In a similar manner, the frequently-used letters from the middle row of a Dvorak keyboard are shown here in a middle circle of the virtual keypad 136. Such letters may be selected by a user simply by dragging in a particular direction. The number of characters in a particular row may be selected so as to permit a system to discern a user's intended input, so that a user does not frequently drag in the direction of a letter they did not intend to submit.

Other, less frequently-used letters are shown in a second ring, where selection of such letters may require a dragging motion followed by a single tap (or a tap followed by a dragging motion), to indicate that the outer row of letters is the user's intent. An indicator 138 in the middle of the keypad 136 can provide a number of different indications. For example, here the indicator 138 shows the number "1", corresponding to the particular keypad shown here. A "2," in contrast, may represent that a different portion of the keypad is shown. For example, punctuation is not currently shown on display 110, but a user may switch so that the keypad 136 changes to show, and accept input for, punctuation. Such a change may occur by a variety of gestures, such as a circular dragging, by tapping in all four corners or two opposed corners of the display 110, or by swiping along the length of one side of the display (e.g., along the entire length or substantially the entire length). Certain frequently used punctuation, such as commas and periods, or other frequently-used keys may also be included in a main ring of a virtual keyboard.

Alternatively, a user intent to enter a character that is on an outer ring may be inferred from user actions during the entry of dragging operation. In one example, the dragging operation may contain multiple segments, where the first segment indicates a direction, and a second segment indicates which row of a multi-row (or multi-circle) keypad to select. For example, a user may simple drag in a straight line to indicate entry from an inner circle, but may double-back (or hook to the left or right) before lifting their finger to indicate an intent to enter a character from an outer circle.

As with the other displays, display 110 shows a data entry box 140 to provide visual feedback of characters that have been entered, or at least registered by the user's device. Such characters may also be spoken audibly to the user as each character is registered.

Three different dragging entries, labeled A to C and numbered 142, 144, and 146, respectively, correspond to the three letters shown in the data entry box 10. Dragging entry 142 is a complex entry because it involves an initial tap, and two entry segments that are separated by a change in direction. The initial tap is shown by a dotted circle and may be employed by a user to indicate that the upcoming dragging motion relates to the outer circle rather than the inner circle. A hook 142a in the entry may represent a variety of intents. For example, the hook may indicate which circle the user would like the application to select a letter from the outer circle. The right hook shown here may represent the inner circle.

The hook may also represent a mid-course correction by the user. For example, as the user dragged upward, their device may have interpreted the input as a "p" rather than a "q" and may have spoken the letter "p" as soon as the entry was sufficient to indicate such an intent. Upon hearing the device say "p," the user may have been alerted that the device was interpreting their intent in an improper manner, and may have turned slightly to the right to indicate that they intended to select the key to the right (or clockwise of) the "p"—i.e., the "q" key.

Subsequent entries 144 and 146 indicate intents to enter the letters "u" and "i." The user's intent to select from the inner circle may be inferred from the lack of a tapping input preceding or following the dragging entries.

The device may also make intelligent contextual selections from user inputs. For example, a disambiguation dictionary may be used to determine which of the two rows of characters in display 110 is intended, based on the frequency with which the particular letters appear together in ordinary usage, much like typical text entry completion methods work to disambiguate text entry. For example, entry B may represent, ambiguously, the entry of a "u" or a "b", and reference to a disambiguation dictionary may indicate that the letters "qu" are used together much more often than the letters "qb," so that the system will disambiguate the entry to represent the letter "u."

Figure 2:
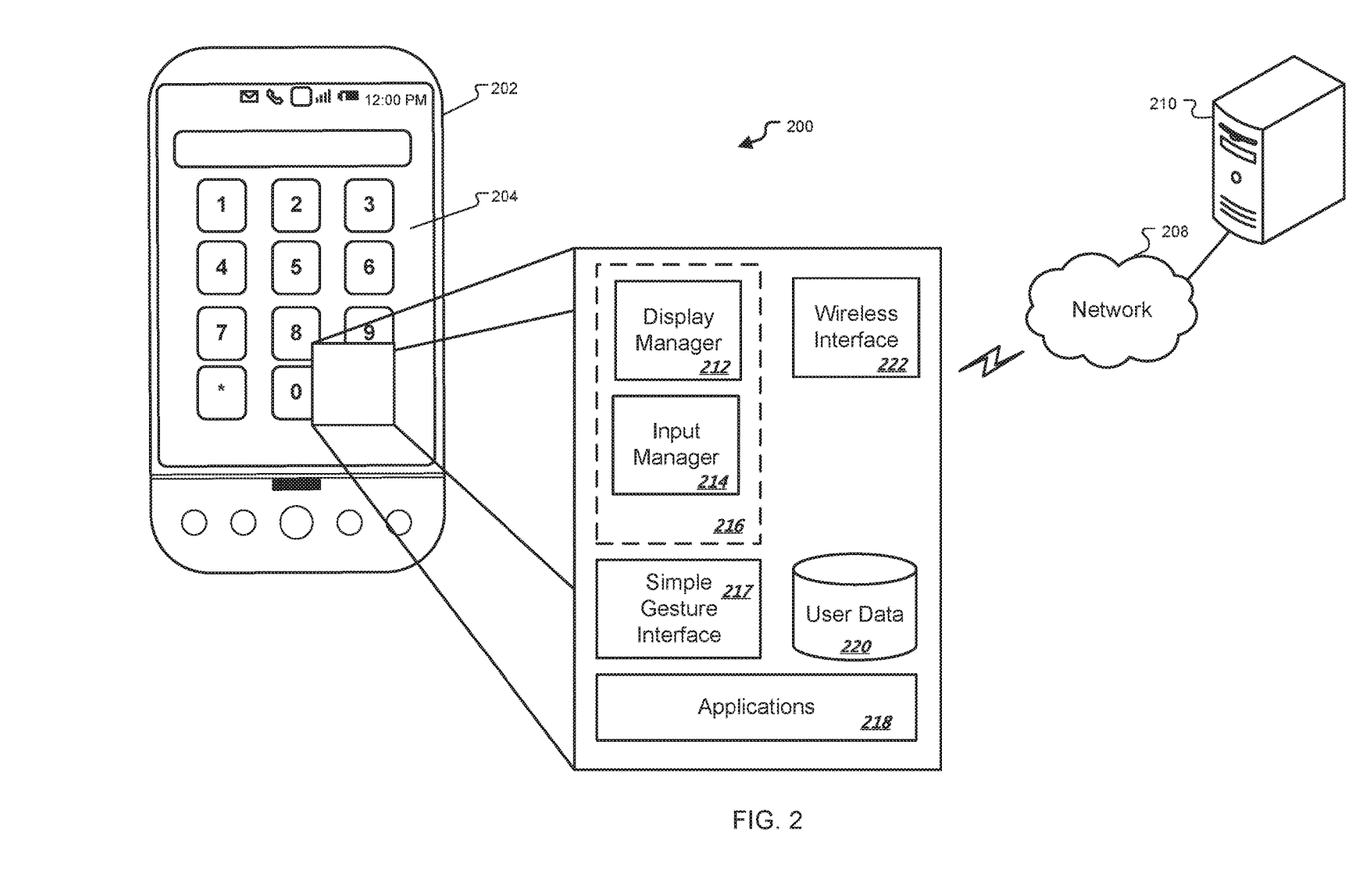
FIG. 2 is a block diagram of a system for providing quick touchscreen user input.

FIG. 2 is a block diagram of a system 200 for providing quick touchscreen user input. In general, the system is represented by a mobile device 202, such as a smart phone, having a touchscreen user interface 204. In addition, the device 202 may have alternative input mechanisms, such as a clickable trackball 206 and other selectable buttons, in addition to a physical keyboard that can be uncovered by sliding the display outward.

The device 202 may communicate via a wireless interface 222, through a network 208 such as the internet and/or a cellular network, with servers 210. For example, the device 202 may carry telephone calls through the telephone network or using VOIP technologies in familiar manners. Also, the device 202 may transmit regular data over the internet, such as in the form of HTTP requests directed at particular web sites, and may receive responses, such as in the form of mark-up code for generating web pages, as media files, as electronic messages, or in other forms.

A number of components running on one or more processors installed in the device 202 may enable a user to have simplified input on the touchscreen interface 204. For example, an interface manager 216 may manage interaction with the touchscreen interface 204, and may include a display manager 212 and an input manager 214.

The display manager 212 may manage what information is shown to a user via interface 204. For example, an operating system on the device 202 may employ display manager 212 to arbitrate access to the interface 202 for a number of applications 218 running on the device 202. In one example, the device 202 may display a number of applications, each in its own window, and the display manager may control what portions of each application are shown on the interface 202.

The input manager 214 may control data that is received from a user via the touchscreen 204 or other input mechanisms. For example, the input manager 214 may coordinate with the display manager 212 to identify where, on the display, a user is entering information so that that the device may understand the context of the input. In addition, the input manager 214 may determine which application or applications should be provided with the input. For example, when the input is provided within a text entry box of an active application, data entered in the box may be made available to that application. Likewise, applications may subscribe with the input manager so that they may be passed information entered by a user in appropriate circumstances. In one example, the input manager 214 may be programmed with an alternative input mechanism like those shown in FIG. 1 and may manage which application or applications are to receive information from the mechanism.

A simple gesture interface 217 may also be provided for similar purposes. In particular, the simple gesture interface 217 may be a program module or other form of application, such as a widget or gadget, that serves as an intermediary between other applications on a device and the interface manager 216. Applications 218 may initially register with the simple gesture interface 217 when they are originally launched. In certain embodiments, the applications 218 may identify one or more directions for which it would like to receive inputs, e.g., by designating downward movement as an "8" for a telephone-based application. Using a known API, for example, the application may submit an array or other data structure of parameters of direction and input keys to be associated with user inputs in those directions. Where multi-direction inputs are to be interpreted, the applications 218 may submit information in a similar, but more expansive, manner.

The simple gesture interface 217 may then interact with the interface manager 216, such as by registering itself with the interface manager 216. When a user performs activities associated with such a registration, so as to indicate that the user would like to use the input mechanisms described here (e.g., by placing the device 202 in a pocket, by shaking the device 202 in a particular manner, or by dragging across display 204 in a particular manner), the interface manager 216 may report subsequent inputs by the user to the simple gesture interface 216. For example, the interface manager may report the X and Y coordinates of each line traced by a user or of points along a curve or other pattern traced by the user. The interface manager 216 may also report if the user entered any taps and where those taps occurred on the display 204.

The simple gesture interface 217 may then interpret such input and report it in an appropriate manner to the relevant application or applications 218. For example, the simple gesture interface 217 may report a direction of a dragging input and the occurrence of any taps relevant in time to the dragging, and the application may interpret such data. Alternatively, the simple gesture interface 217 may interpret the data in a greater manner, such as by correlating a certain dragging direction with a keystroke that was previously registered by the application as corresponding to the direction. The simple gesture interface 217 may then pass the keystroke to the application.

The simple gesture interface 217 may also reformat data in other manners. In one example, a dialer application may not have been written to work with the input mechanisms described here. Instead, the dialer may receive information about which objects (in the form of virtual telephone keypad buttons) have been pressed by a user. A simple gesture interface 217 may be programmed to reside in a communication channel between the interface manager 216 and the application, and may convert directional dragging inputs into the form of messages that the dialing application expects to see from the interface manager 216. In this manner, the system 200 can provide a number of different manners in which to provide quick user touchscreen input to one or more applications running on device 202.

Finally, a user data database 220 may store information about particular user preferences or parameters. For example, the database 220 may store an identifier of an application that is to receive input from the simple gesture interface 216 in various contexts. As one example, a dialer application may be set by default to receive such input when the input is made over an operating system desktop. The user data database 220 may also include information such as the type of virtual keypad a user prefers to have their inputs mapped to (e.g., QWERTY or Dvorak), and other relevant data needed to provide an alternative mechanism for providing input.

Figure 3A:
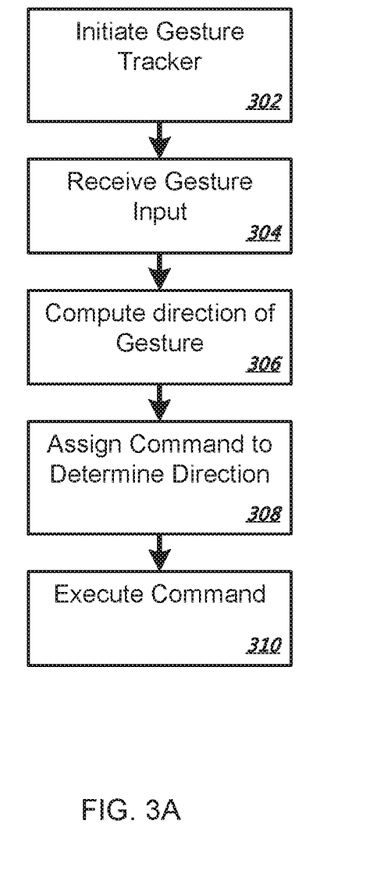
FIG. 3A is a flowchart of a process for receiving touchscreen user inputs.

FIG. 3A is a flowchart of a process for receiving touchscreen user inputs. In general, the process involves the use of a gesture tracking program to determine the form of user inputs on a touchscreen interface, and then to convert those inputs into particular commands (e.g., key presses) to be executed on computing device.

At box 302, the process begins by the initiation of a gesture tracker 302. The gesture tracker may, for example, be a component of an operating system that launches when the device is powered up, and that runs in the background to provide for gesture-based input to the system. The tracker may alternatively be an application separate form the core operating system, such as a gadget or widget, that communicates with touchscreen managing components of an operating system.

At box 304, the device receives a gesture input. Any contact with the touchscreen may initially be interpreted as a gesture input. Such an input may then go through a filtering process, such as by filtering out contacts that are too broad-based to be intentional inputs because they likely represent accidental contact with something other than a fingertip or stylus. Also, certain inputs may be filtered and passed to various different applications, where one of the applications processes gestures like those described above.

For gestures that are determined to relate to inputs that are to be judge by their direction of dragging relative to a base point, the direction of dragging may be computed at box 306. In particular, endpoints for a dragging operation may be determined in a familiar manner, and the angle between the endpoints may be computed. The angle may be generalized, in addition, such as to a nearest round angle (e.g., the nearest 15 degrees) or nearest compass direction (e.g., one of the eight or sixteen main compass directions). Other representations for an angle or direction of a dragging input, or a pair of tapping inputs, may also be employed.

At box 308, a command or key press that has previously been correlated with the direction may be assigned to the received gesture, and may be executed at box 310. The command may be assigned, for example, by a helper application that is dedicated to receiving data on such user inputs and passing commands to associated applications. Also, applications themselves may correlate a direction with a command or keystroke.

Figure 3B:
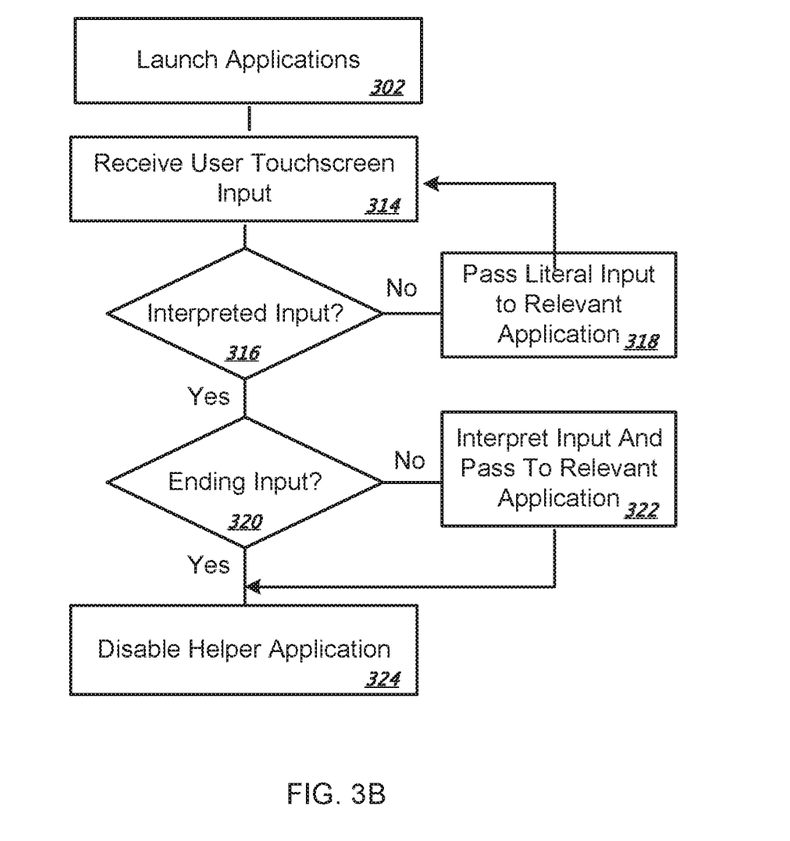
FIG. 3B is a flowchart of a process for interpreting touchscreen inputs on behalf of applications for which a user makes the inputs.

FIG. 3B is a flowchart of a process for interpreting touchscreen inputs on behalf of applications for which a user makes the inputs. In general, the process involves tracking user inputs, determining which inputs can be passed literally to an application and which require interpretation, and interpreting the relevant inputs before passing them, as interpreted, to an application.

The process in this example begins at box 312, where relevant applications are launched. The applications may include end-user application such as telephone dialers, chat programs, note taking programs, and the like. The application may also include intermediary applications, such as helper applications that work to translate inputs from a touchscreen for direct use by the end-user applications. The applications may perform relevant processes, and at some point, may await events triggered by a user. For example, an event manager may receive information about contacts made with a touchscreen and may alert one or more relevant applications. For example, at box 314, a user touchscreen input is received. The input could take a variety of forms, such as one or more taps, and one or more dragging motions that may occur in straight lines, curves, or more complex shapes. At box 316, the process first determines whether the input is in a form that needs to be interpreted. For example, if the input is a tap on a program object that is intended to receive user inputs, such as a selectable button, such an action may be reported directly to the application that generated the object (box 318).

If the input needs to be interpreted, the process may determining whether it is a substantive input or an input to stop the acceptance of such interpreted inputs (box 320). If it is the latter, a helper application that assists in interpreting inputs may be closed or disabled (box 324). For example, a user may have previously had their mobile device in their pocket, and thus been using a helper application that would interpret their inputs that did not require visual attention, but may have then taken the device out. Such a user may be able to use a keyboard directly by tapping on the actual or literal objects such as individual keys on a keypad. As such, the user may take an action to move the helper application out of the way in such a situation.

If the interpreted input is not an ending input, then the input needs to be interpreted and passed to the relevant application (box 322). For example, a user may have entered a dragging input in a particular direction on the touchscreen face, where the user understands a particular direction to represent a particular keypress. The correlation of that direction to the keypress may have been previously registered, and a look-up may be used to identify the keypress from the direction. An identifier for the keypress may thus be passed to the application, so that the application may register the intended user input.

In this manner, a computing device may be provided with a flexible system by which to aid various applications in receiving input from a user who cannot use their device in an originally-intended manner that requires visual contact with the device. Rather, each application (or the helper application itself) may define a number of alternative input gestures that do not require the level of visual attention required by the original gestures, and may receive notice that the original gestures were received, by the helper application that translates the alternative gestures to the results associated with the original gestures.

Figure 4:
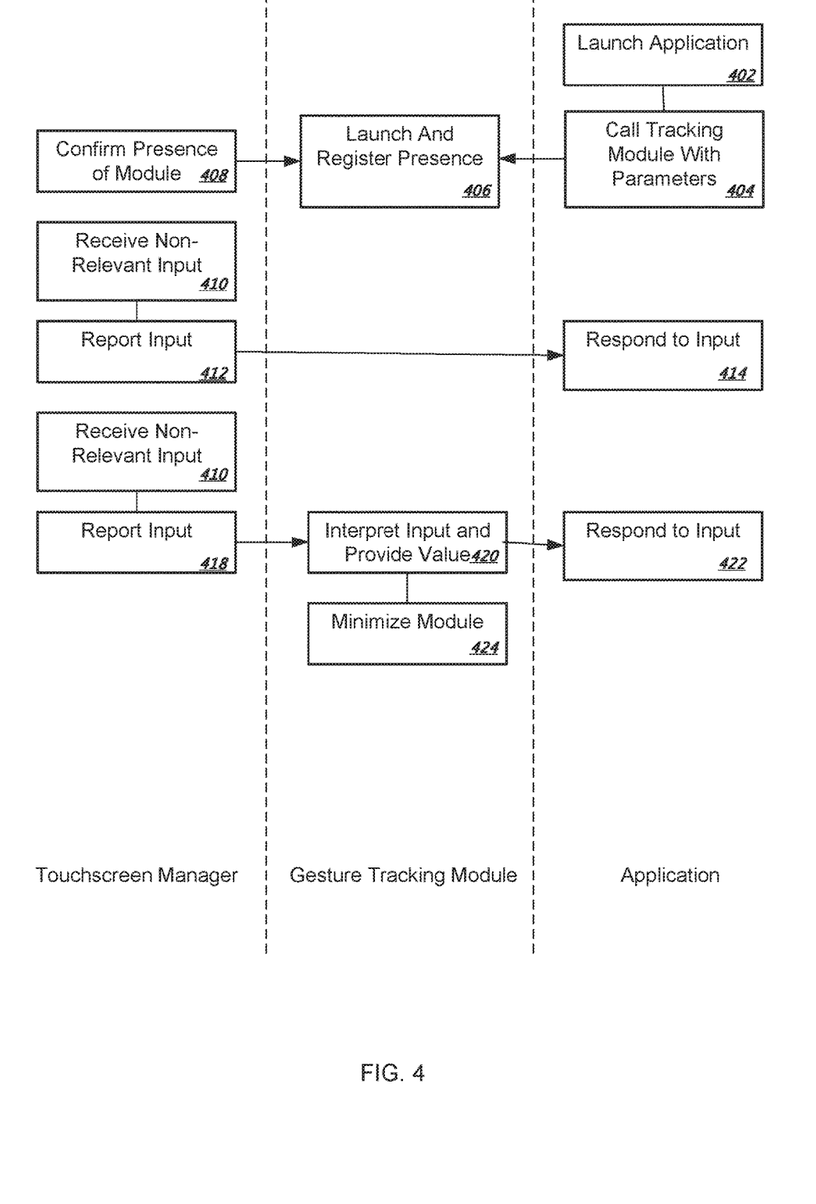
FIG. 4 is a swim lane diagram of a process by which a gesture tracking module interfaces between a computer application and a touchscreen.

FIG. 4 is a swim lane diagram of a process by which a gesture tracking module interfaces between a computer application and a touchscreen. In general, the process is shown here to highlight one example by which various components may execute to receive user inputs where the user need not be looking at a display on which they entered the inputs. Other arrangements and cooperation between and among components may also be used.

The process begins at box 402, where an application is launched. The application may take a variety of forms, such as a dialing application for a smart phone. Upon launching, the application may call a gesture tracking module (box 404) for assistance in managing certain inputs such as directional dragging inputs on a touchscreen display. At box 406, the gesture tracking module launches and registers its presence with an operating system, such as a touchscreen manager component of a device operating system that is responsible for reporting contact activity entered through the touchscreen. The touchscreen manager, at box 408, then confirms back to the gesture tracking module, that it has recognized the latter's registration.

At box 410, the touchscreen manager receives an input that is not of the type handled by the gesture tracking module. For example, the input may be in an area on the touchscreen that is outside an area registered to the gesture tracking module. Or the input may be a curved input or a tap, where the gesture tracking module registered to receive information only about substantially straight-lined dragging inputs. In such a situation, the touchscreen manager may look to registration information from various applications running on a device, and may report the input from the user to the appropriate application (boxes 412 and 414). The relevant application can then respond to the received input, such as by responding to a button push on a virtual keypad on the touchscreen.

A subsequent user input is received at box 416 (and follow up inputs may be received repeatedly after the processing of other inputs). This subsequent user input is determined to be an input in a form that is relevant to the gesture tracking module, and thus is reported to that module at box 418. For example, perhaps a user initially tapped a first digit on a telephone dialer, and then needed to glance away from their device, and was able to continue dialing using directional dragging motions. The gesture tracking module may then, based on information previously received from, or on behalf of, the application, convert the information from the touchscreen manager into a command or keypress for the application (box 420).

The gesture tracking module then sends such information to the application, which may respond to the input at box 422. In this example, the gesture tracking module may have been brought forward on the device via some particular action by the user, and at box 424 it is again minimized and moved out of the way. In other words, a visual representation of the module on the touchscreen may be removed, and no inputs on the touchscreen may be interpreted as being directed to the module—even if they would otherwise match a signature registered with the touchscreen manager by the gesture tracking module.

Figure 5:
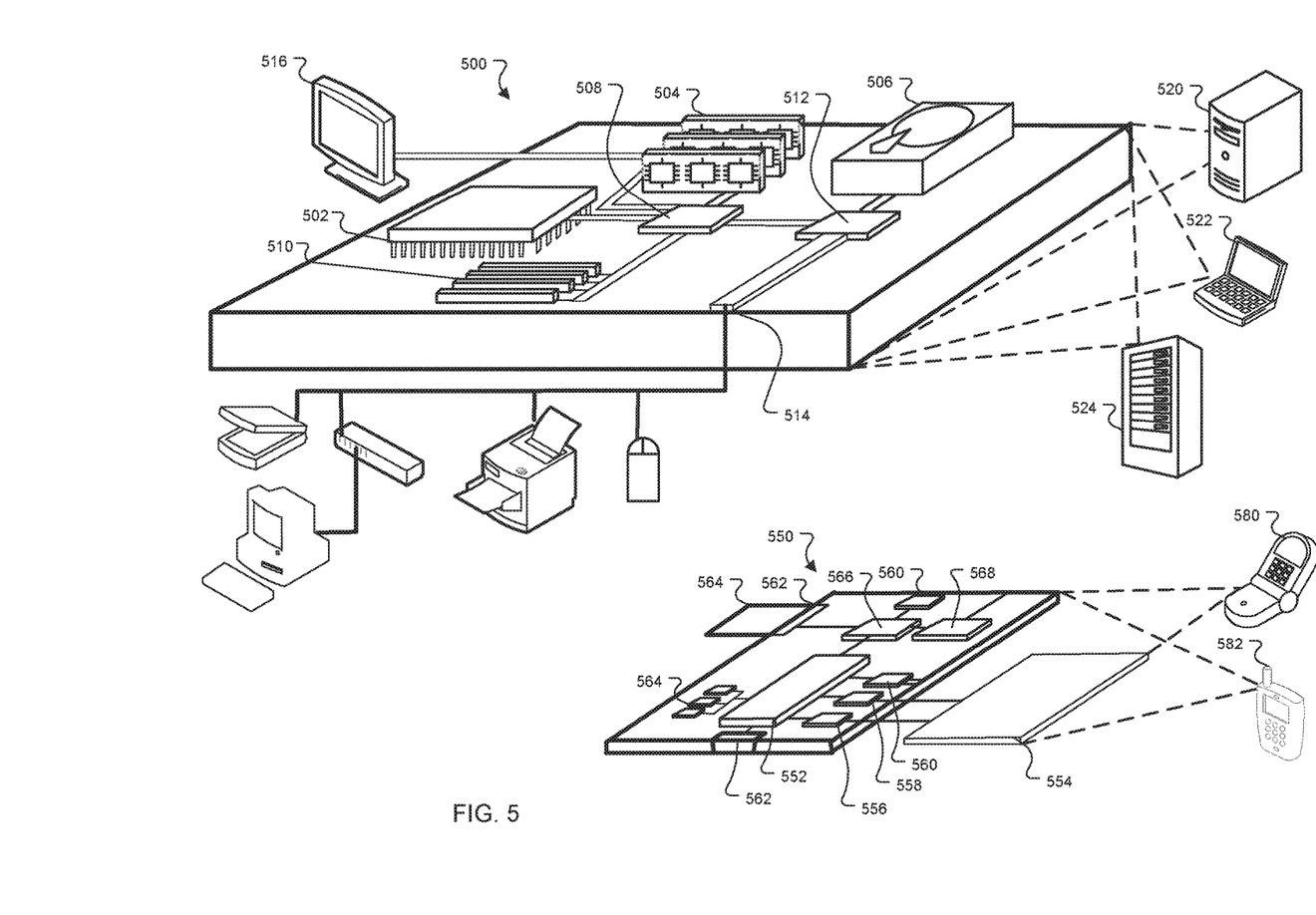
FIG. 5 shows an example of a computer device and a mobile computer device that can be used to implement the techniques described here.

FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, memory on processor 502, or a propagated signal.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port

514. The low-speed expansion port, which may include various communication ports (e.g., USB, Short Range Communication (e.g., BLUETOOTH™), Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Short Range Communication (e.g., BLUETOOTH™), WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to a telephone dialing application, but other forms of applications and keypad layouts may also be addressed, such as keypads involving graphical icons and macros, in addition to alphanumeric characters.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
    displaying a reference keyboard on a display screen of a computing device;
    receiving, while the reference keyboard is displayed, data indicating a user input gesture on the display screen of the computing device, wherein the user input gesture is a dragging input gesture;
    identifying that the dragging input gesture dragged in a particular direction, wherein the dragging input gesture began at a location that is different from a location of a first key of the reference keyboard;
    identifying, based on the direction of the dragging input gesture, that the user input gesture represents a first user selection, the first user selection being a selection that is associated with a second key that is located in the particular direction away from the first key of the displayed reference keyboard; and
    providing data indicating the first user selection.

2. The computer-implemented method of claim 1,
    wherein the user input gesture comprises a first input gesture beginning in a first area of the display screen, the method further comprising:
    receiving data indicating a second input gesture beginning in a second area of the display, wherein no portion of the second area overlaps any portion of the first area;
    determining a direction of the second input gesture;
    identifying that the second input gesture represents a second user selection based at least on determining that the second input gesture began in the second area of the display and on determining the direction of the second input gesture, the second user selection being different from the first user selection; and
    providing data indicating the second user selection.

3. The method of claim 2, wherein the first user selection corresponds to a first character, wherein the second user selection corresponds to a second character, the method further comprising:
    displaying the first character followed by the second character on the display.

4. The method of claim 2, wherein the direction of the first input gesture and the direction of the second input gesture are the same direction.

5. The method of claim 4, wherein identifying the first user selection comprises identifying a first character and wherein identifying the second user selection comprises identifying a second character, the second character being distinct from the first character.

6. The method of claim 2, wherein the first area of the display is a first portion of a split screen and the second area of the display is a second portion of the split screen.

7. The method of claim 2, wherein the first area of the display is a first half of a split screen and the second area of the display is a second half of the split screen.

8. The method of claim 2, wherein identifying the second user selection comprises identifying a third key of the reference keyboard displayed on the display screen, the third key being distinct from the second key.

9. The method of claim 1, wherein the dragging input gesture is followed by a number of taps, and wherein identifying that the user input gesture represents the first user selection comprises:
    identifying the number of taps following the dragging input gesture;
    identifying the first user selection based at least on the direction of the dragging input gesture of the user input gesture and the identified number of taps.

10. The method of claim 1, wherein providing data indicating the first user selection comprises generating, by the computing device, audible feedback that identifies the first user selection.

11. The method of claim 1, wherein providing data indicating the first user selection comprises providing, by the computing device, tactile feedback indicating that the user input gesture represents the first user selection.

12. The method of claim 1, wherein a location where the user input gesture began corresponds to a first selectable element, and wherein the first user selection corresponds to a second selectable element, the second selectable element being different than the first selectable element, wherein the first selectable element can be selected through user tapping input at a location of the first selectable element and the second selectable element can be selected through user tapping input at a location of the second selectable element.

13. The method of claim 1, wherein a location where the first input gesture ended corresponds to a first selectable element, and wherein the first user selection corresponds to a second selectable element, the second selectable element being different than the first selectable element, wherein the first selectable element can be selected through user tapping input at a location of the first selectable element and the second selectable element can be selected through user tapping input at a location of the second selectable element.

14. A computer-implemented method comprising:
receiving data indicating a user input gesture, the user input gesture being a dragging input gesture;
determining, by one or more computing devices, a direction of the user input gesture, wherein the user input gesture began at a location that is different from a location of a first key of an undisplayed reference keyboard,
wherein the reference keyboard is not displayed by the one or more computing devices for an entirety of time that the user input gesture is received;
identifying, by the one or more computing devices and based on the direction of the user input gesture, that the user input gesture represents a user selection of a second key of the undisplayed reference keyboard that is located in the particular direction away from the first key of the undisplayed reference keyboard; and
providing data indicating the user selection of the second key.

15. A non-transitory computer readable storage device encoded with a computer program, the program comprising instructions that, if executed by one or more computers, cause the one or more computers to perform operations comprising:
displaying a reference keyboard on a display screen of a computing device;
receiving, while the reference keyboard is displayed, data indicating a first input gesture, the first input gesture being a dragging input gesture;
determining a direction of the first input gesture, wherein the dragging input gesture began at a location that is different from a location of a first key of the reference keyboard;
identifying, by the computing device, that the first input gesture represents a first user selection based at least on the direction of the first input gesture without regard to a location where the first input gesture ended, the first user selection being a selection that is associated with a second key of the reference keyboard that is located in the direction of the first input gesture away from the first key of the reference keyboard;
receiving data indicating a second input gesture, the second input gesture being a dragging input gesture in a direction that is different than the direction of the first input gesture;
determining the direction of the second input gesture;
identifying, by the computing device, that the second input gesture represents a second user selection based at least on the direction of the second input gesture without regard to a location where the second input gesture ended, the second user selection being a selection that is associated with a third key of the reference keyboard that is located in the direction of the second input gesture away from the first key of the reference keyboard, the third key being different from the second key; and
providing data indicating the second user selection.

16. The computer readable storage device of claim 15, wherein identifying the first user selection comprises identifying a first character and wherein identifying the second user selection comprises identifying a second character, the second character being distinct from the first character.

17. The computer readable storage device of claim 15, wherein the dragging input gesture is followed by a number of taps, and wherein identifying that the first input gesture represents the first user selection comprises:
identifying the number of taps following the dragging input gesture; and
identifying the first user selection based at least on the direction of the dragging input gesture of the first input gesture and the identified number of taps included.

18. A computing device comprising:
a touchscreen display screen; and
memory storing instructions that are operable, when executed by the computing device, to cause the computing device to perform operations comprising:
displaying a reference keyboard on the touchscreen display screen;
receiving, while the reference keyboard is displayed, data indicating a first input gesture, the first input gesture being a dragging input gesture;
determining a direction of the first input gesture, wherein the dragging input gesture began at a location that is different from a location of a first key of the reference keyboard;
identifying, by the computing device, that the first input gesture represents a first user selection based at least on the direction of the first input gesture without regard to a location where the first input gesture ended, the first user selection being a selection that is associated with a second key of the reference keyboard that is located in the direction of the first input gesture away from the first key of the reference keyboard;
receiving data indicating a second input gesture, the second input gesture being a dragging input gesture in a direction that is different than the direction of the first input gesture;
determining the direction of the second input gesture;
identifying, by the computing device, that the second input gesture represents a second user selection based at least on the direction of the second input gesture without regard to a location where the second input gesture ended, the second user selection being a selection that is associated with a third key of the reference keyboard that is located in the direction of the second input gesture away from the first key of the reference keyboard, the third key being different from the second key; and
providing data indicating the second user selection.

19. The computing device of claim 18, wherein the dragging input gesture is followed by a number of taps, and wherein identifying that the first input gesture represents the first user selection comprises:
identifying the number of taps following the dragging input gesture; and
identifying the first user selection based at least on the direction of the dragging input gesture of the first input gesture and the identified number of taps included.

* * * * *

UNITED STATES PATENT AND TRADEMARK OFFICE
CERTIFICATE OF CORRECTION

| | |
|---|---|
| PATENT NO. | : 10,466,890 B2 |
| APPLICATION NO. | : 15/466241 |
| DATED | : November 5, 2019 |
| INVENTOR(S) | : Raman et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 278 days.

Signed and Sealed this
Fourteenth Day of July, 2020

Andrei Iancu
*Director of the United States Patent and Trademark Office*